Sheet 1—2 Sheets

H. J. Johnson.
Corn-Planter
N° 72501      Patented Dec. 24, 1867.

Witnesses:
Theo Fusche
Wm Trewin

Inventor
H. J. Johnson
Per Munn & Co.
Attorneys

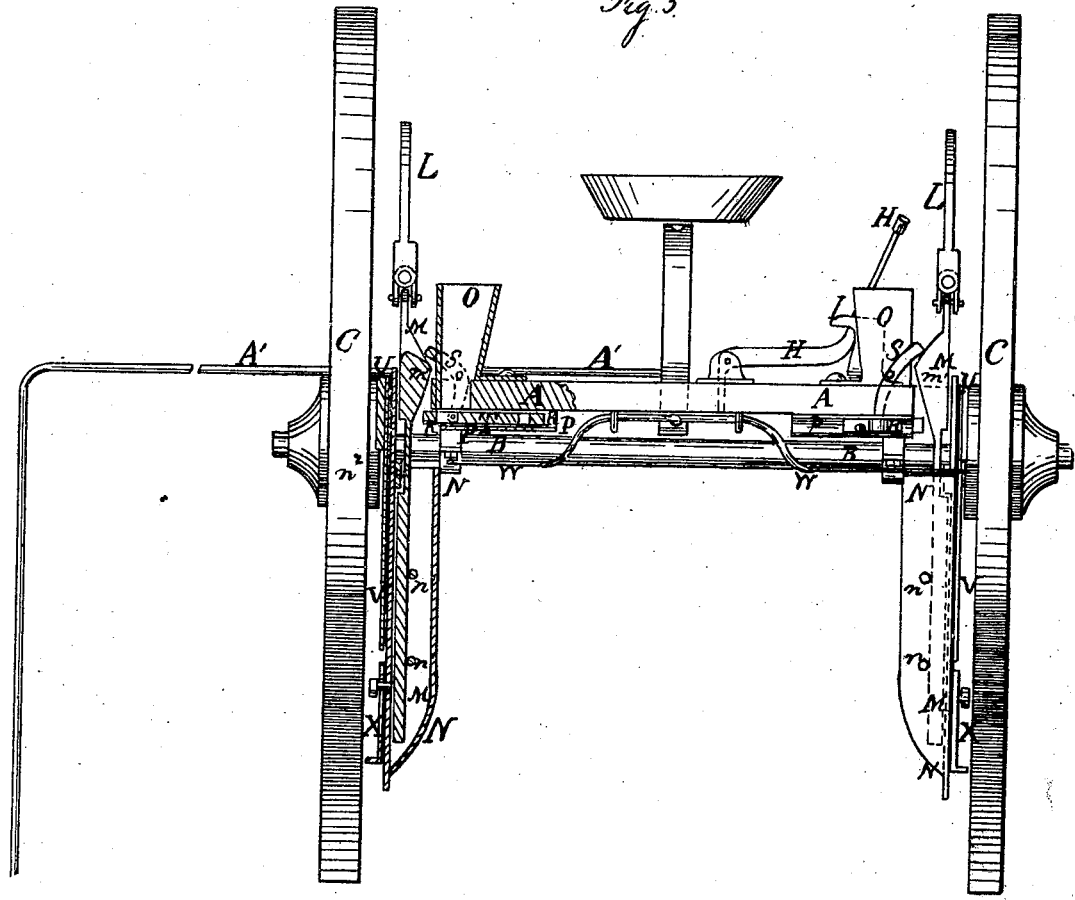

United States Patent Office.

HANS J. JOHNSON, OF ST. PETER, MINNESOTA.

Letters Patent No. 72,501, dated December 24, 1867.

IMPROVEMENT IN CORN-PLANTER.

*The Schedule referred to in these Letters Patent and making part of the same.*

TO ALL WHOM IT MAY CONCERN:

Be it known that I, HANS J. JOHNSON, of St. Peter, in the county of Nicollett, and State of Minnesota, have invented a new and useful Improvement in Corn-Planters; and I do hereby declare that the following is a full, clear, and exact description thereof, which will enable others skilled in the art to make and use the same, reference being had to the accompanying drawings forming part of this specification.

Figure 3 is a rear view of the same, part being broken away to show the construction.

Similar letters of reference indicate corresponding parts.

Figure 1:
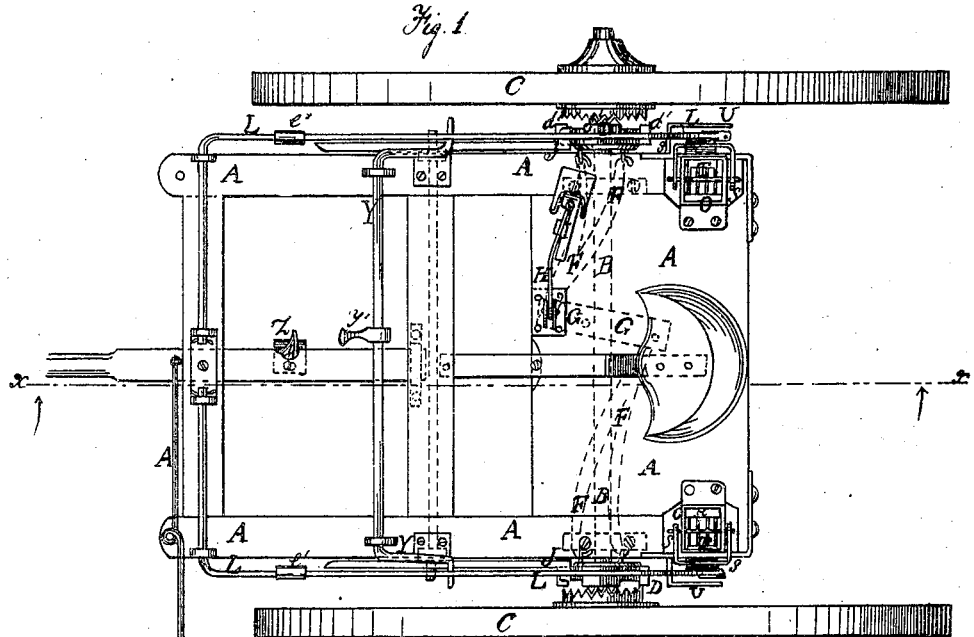
Figure 1 is a top or plan view of my improved machine.
Figure 2:
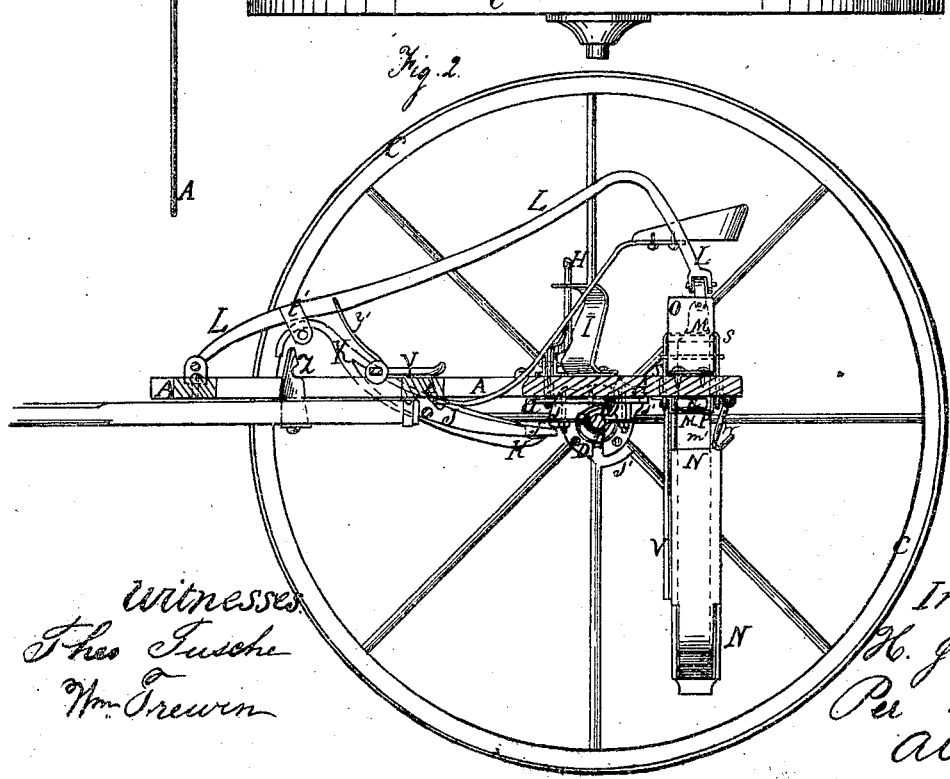
Figure 2 is a vertical longitudinal section of the same, taken through the line $x\,x$, fig. 1.

My invention has for its object to furnish an improved machine for planting corn, cotton, sugar-cane, and other seeds in hills, which shall be easily operated and accurate in operation; and it consists in the construction, combination, and arrangement of the various parts of the machine, as hereinafter more fully described.

A is the frame of the machine; B is the axle, which revolves in bearings attached to the frame A; C are the wheels, which revolve loosely upon the axle B, and which are made to carry the said axle B by means of the clutch-wheels D, which fit upon a square part of the axle, and which have teeth formed upon their outer sides which fit into teeth formed upon the inner ends of the hubs of the wheels C. In a chamber or recess, formed in the inner side of the central part of the clutch-wheels D, is placed and secured a ring, E, about which the said clutch-wheels D revolve, and within which the axle B revolves. To the inner sides of the rings E are attached the outer ends of the connecting-rods F, the inner ends of which are pivoted to the ends of the bar G, which is pivoted at its central point to the under side of the frame A. H is a bent lever, which is pivoted to a support attached to the frame A. The lower end of the bent lever H is pivoted to one end of the pivoted bar or plate G, and its upper end extends up into such a position that it may be conveniently reached and operated by the driver from his seat, to throw the clutch-wheels D into and out of gear with the wheels C. I is a catch, attached to the frame A in such a position that it may take hold of the lever H, and hold the clutch-wheels D either into or out of gear with the wheels C, as may be desired. To the face of the clutch-wheels D are attached two or more cogs or teeth, $d'$, according to the distance apart it is desired to have the hills. J is a catch or pawl, pivoted to the side of the frame A, the forward end of which rests upon the forward end of the lever K, in such a position that when the clutch-wheel D is revolved in one direction, the cogs $d'$ may lift the catch J out of the way and pass on, but when the clutch-wheel D revolves in the other direction, the cogs $d'$ will press the catch J down and operate the lever K. The lever K is pivoted to the side of the frame A, and its farther end rests against the under side of the lever L, being kept in proper relative position by passing through a keeper, $l'$, attached to the said lever L. The forward ends of the levers L are securely pivoted to the forward part of the frame A. From this point they pass back, and a little in the rear of the axle B they are bent downwards at right angles, and to their lower ends are connected by a double joint the upper ends of the bars or plates M. The bars M pass down through the dropping-spouts N, against the outer sides of which they are kept by the guide-pins $n^1$, as shown in fig. 3. The movement of the spout N upon the bar M is limited by the block $n^2$, attached to the box N, which enters a long notch formed in the outer side of the bar M, as shown in fig. 3. By this construction and arrangement, every time the catch J is operated by the cogs $d'$ the dropping-spouts N will be raised to receive the seed from the hoppers O. The seed-hoppers O are attached to the upper side of the frame A, directly over holes in the said frame. P is a slide or bed-plate, attached to the under side of the frame A, directly beneath the hopper O. R is a frame, sliding back and forth in the slide P, being moved back by the double incline $m'$, formed upon or attached to the inner side of the bar M, and being moved forward by the same double incline $m'$ acting upon the arms S, pivoted to the sides of the hoppers O, and the lower ends of which are pivoted to the said frame R. T are short bars, adjustably secured in and to the frames R by set-screws, or by other convenient means, so that they may be adjusted according to the smallness of the seed and the number of grains to be dropped for each hill. The bars or plates M are held forward so as to operate the frame R and arms S by guides U, attached to the frame A, and the bars M and spouts N are kept in proper position, while moving up and down, by the spring-guides V, attached to the guides U. W is a spring, attached to the under side of the rear part of the frame A, in such a position that its free ends may rest upon the upper ends of the dropping-spouts N when raised to give an impulse to the said spouts when the spouts N and bars M are allowed to descend, so that the said spouts may descend in advance of the said bars, carrying the seed into the ground before the lower ends of the said spouts may be opened by the lower ends of the said bars forcing out the seed. X are stops, adjustably attached to the sides of the spouts N by set-screws, passing through slots in the stems of the said stops, and screwing into the said spout. By adjusting the stops X the seed may be planted at any desired depth in the ground. Y is a bent lever, acting upon the levers L, by means of which the bars M and spouts N may be raised and held away from the ground when and as long as may be desired. Z is a catch, upon which the handle $z'$ of the lever Y may be caught to hold the said bars and spouts suspended. $A'$ is a guide-bar, attached to the forward part of the frame A, near the tongue, and extends out at the side of the machine a distance equal to the distance of the rows apart. At this point it is bent at right angles, and descends nearly to the ground, so as to serve as a guide to keep the rows at a uniform distance apart. The guide-bar, or rod $A'$, should be so arranged that it may be turned to one or the other side of the machine, as may be required.

I claim as new, and desire to secure by Letters Patent—

1. The combination of the bent lever H, pivoted bar or plate G, connecting-rods F, rings E, and toothed clutch-wheels D with each other and with the frame A, axle B, and hubs of the wheels C, substantially as herein shown and described, and for the purpose set forth.

2. The combination of the pivoted catches J, levers K, and bent lever L, with the toothed clutch-wheels D, frame A, and suspended bars or plates M, substantially as herein shown and described, and for the purpose set forth.

3. The dropping-spout N and bar or plate M, constructed as described, in combination with each other and with the bent lever L, substantially as and for the purpose herein set forth.

4. The sliding frame R and adjustable bars T, in combination with the slide P, hopper O, and double incline $m'$ upon the bar M, substantially as herein shown and described, and for the purpose set forth.

5. The combination of the arms S with the sliding frame R, and with the double incline $m'$, formed upon the bar M, substantially as herein shown and described, and for the purpose set forth.

6. The combination of the spring W with the dropping-spout N, substantially as herein shown and described, and for the purpose set forth.

7. The combination of the adjustable stops X with the dropping-spouts N, substantially as herein shown and described, and for the purpose set forth.

8. The combination of the bent lever Y with the levers L, for the purpose of raising and holding the dropping-device away from the ground, substantially as herein shown and described.

HANS J. JOHNSON.

Witnesses:
GEO. HIZLEP,
L. M. BOARDMAN.